Dec. 11, 1923.

F. B. EDELL 1,477,329

FLUSH VALVE

Filed July 26, 1920      2 Sheets-Sheet 1

Inventor
Fred B. Edell.
By Gillson & Gillson
His Attorneys

Dec. 11, 1923.

F. B. EDELL

FLUSH VALVE

Filed July 26, 1920

Inventor
Fred B. Edell.
By Gillan & Gillan
His Attorneys

Patented Dec. 11, 1923.

1,477,329

UNITED STATES PATENT OFFICE.

FRED B. EDELL, OF CHICAGO, ILLINOIS.

FLUSH VALVE.

Application filed July 26, 1920. Serial No. 398,851.

*To all whom it may concern:*

Be it known that I, FRED B. EDELL, a citizen of the United States, and a resident of Chicago, county of Cook, and State of Illinois, have invented certain new and useful Improvements in Flush Valves, of which the following is a specification, and which are illustrated in the accompanying drawings, forming a part thereof.

The invention relates to flush valves for water closets, and the like, and has as an object the provision of a valve that will allow a predetermined amount of water to flow into the bowl, after which the flow will be cut off even though the starting device be held open.

Further objects will appear from the following description when read in connection with the accompanying drawings, in which—

Figure 1:
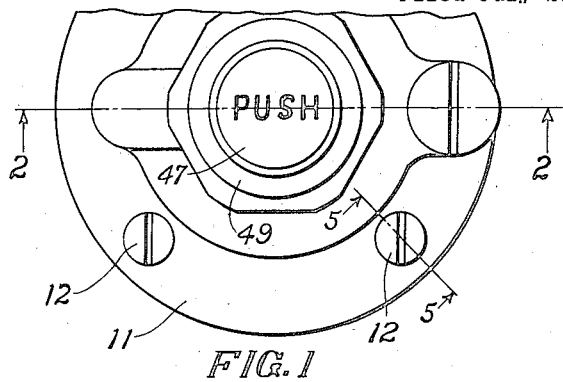
Fig. 1 is a partial plan view.
Figure 3:
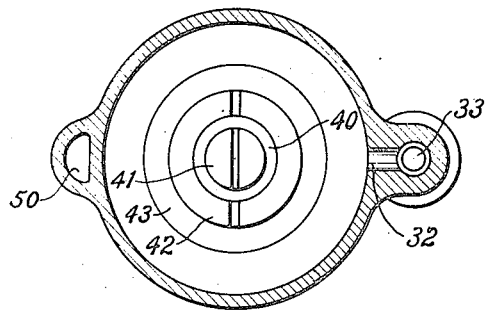
Fig. 3 is a transverse section on line 3—3 of Fig. 2.

As shown the device comprises a base 10 and an upper portion 11 preferably secured to said base by screws 12, the joint between the two parts, being desirably provided with a gasket, as 13. The base 10 is shown as provided with an inlet passage 14, screw-threaded for attachment of a pipe connected with a supply of water under pressure and with an outlet 15, exteriorly threaded at 16 for connection, as by a union, with a water closet bowl.

To control the flow of water from the inlet to the outlet there is shown an opening 17, surrounded by a valve seat 18 and controlled by a valve 19. The valve 19 is shown as comprising a cylindrical member 20, interiorly screw-threaded and provided with a flange 21 for reception of a gasket 22, and a flange 23 forming the base member of a piston. To retain the gasket 22 upon the valve there is shown a member having a stem portion 24, threaded for engagement with the screw-threaded interior of cylinder 20, a shoulder 25, and at its lower portion any suitable form of guide means, as crossed webs 26, to guide the valve to its seat.

To control the action of the valve 19 there is shown a piston comprising the flange 23 as a base, a cup leather 27, and a cup leather retaining member having a flange 28 and a threaded stem 29 for engagement with the threaded interior of the cylinder 20. The piston is shown as coacting with the cylindrical interior of a control chamber 30, comprising the major portion of the interior of the upper portion 11 of the device.

To allow the water under pressure access to the control chamber 30 a passage 31 is shown opening into the chamber at 32. Means to adjust the rate of flow of water through the passage 31 is shown, comprising a needle valve 33 having an end slotted, as at 34, for reception of a screw driver. The cavity in which the slotted end of the needle valve is located may be closed by a cap 35, preferably seating on a gasket, as at 36.

With the water pressure equalized between control chamber 30 and in the space 37 below the piston the pressure downward upon the valve will exceed the upward pressure upon the lower side of the piston by the amount of pressure upon an area equal to the area of the circle of the valve seat. If the pressure in control chamber 30 be released, the valve will be moved upwardly by a force of pressure upon an area equal to the difference between the area of the annulus of flange 23 and that of flange 21 approximately. Thus water will flow through the outlet 15 until the maximum pressure again exists in control chamber 30, due to flow of water past needle valve 33.

To release the pressure in control chamber 30 there is shown a release valve 38, which may be held against its seat by a spring, as 39, acting in compression. Preferably the valve seat 40 for valve 38 is carried in a thimble 41, screwed into the top of the control chamber 30 from within and having a flange 42 adapted to retain a gasket 43, which gasket makes a tight joint about the thimble and also serves as a seat for a check valve 44 to be described. The stem 45 is shown as projecting through a stuffing box 46, and as provided with a button 47, having an apron 48 which is adapted to inclose the spring 39 and to limit the depression of the valve. A sleeve 49 is shown surrounding the button to make a pleasing finish. A channel 50 is provided to permit the escape of water from control chamber 30 to the outlet 15 when the valve 41 is opened, thus relieving the pressure in the control chamber.

Figure 2:
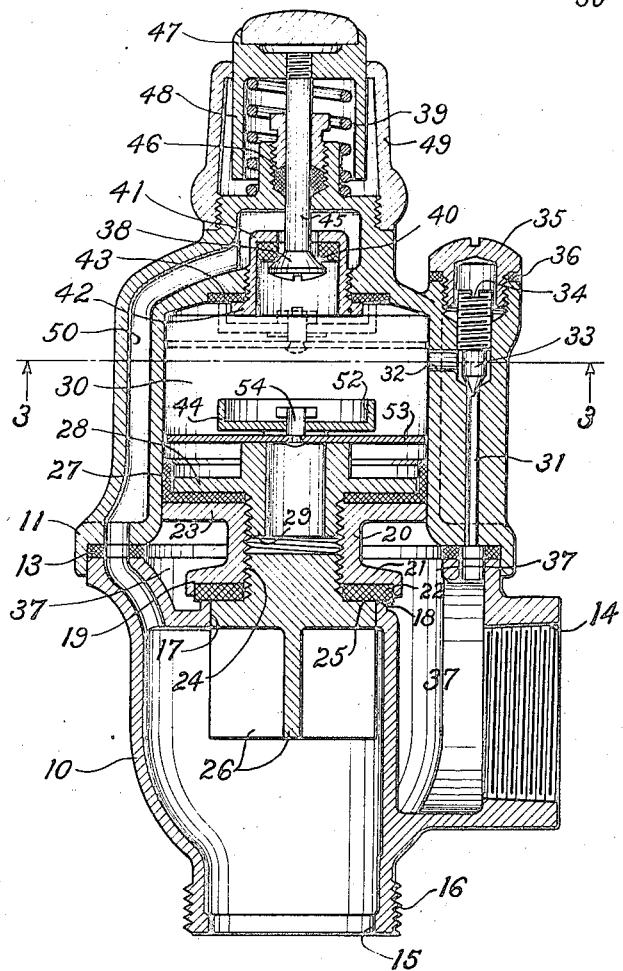
Fig. 2 is a central vertical section on line 2—2 of Fig. 1.

A defect with this type of flush valve as heretofore used has been that the user has been able to waste water by holding a valve, as that at 41, open. To allow only a predetermined amount of water to flow before valve 19 is reseated and the flow stopped, a check valve 44 is provided which is out of control of the user. As shown in Fig. 2, this check valve comprises a cup member 52, loosely connected to a disk 53, as by a rivet 54. The disk 53 is shown as fitting loosely in chamber 30, in order that water may gain ready access to both sides of the disk. The function of the disk 53 is to guide the cup 52 to its seat upon the gasket 38, and it must be large enough to perform the function in coaction with the walls of the chamber 30. When the piston rises, as already described, the cup 52 will seat against gasket 43, thus preventing further flow through valve 41 as water flows into control chamber 30 past valve 33, even though said valve 41 is held open by the user.

The connection of the cup 52 to the disk 53 is made loose to provide a certain amount of flexibility, that the cup may become seated even though the surface of the gasket is not parallel with the surface of the piston which supports the disk. As the pressure in the control chamber 30 becomes equalized with that in space 37 the piston will return the valve 19 to its seat, leaving the check valve 44 held against gasket 43 as long as valve 41 is held open. When valve 41 is again closed there will be the effect of a partial vacuum within cup 52, which is destroyed by leakage about the loose fitting rivet 54, and the disk and cup will return by gravity to rest upon the piston.

Figure 4:
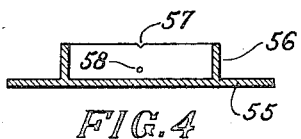
Fig. 4 is a detail central vertical section of a modified form of control disk.
Figure 5:
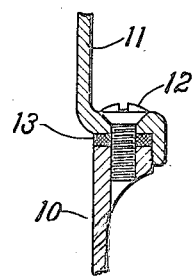
Fig. 5 is a detail vertical section on line 5—5 of Fig. 1.

A modified form of check valve, comprising a disk 55 as shown in Fig. 4, may be used, having a cup 56 integral therewith. This form of check valve is especially suitable for use with a ground metal seat instead of the gasket shown at 43. In this form of valve a notch, as 57, or a minute hole, as 58, or both, may be provided to break the vacuum upon closing of the release valve.

The amount of water which will escape through the outlet 15 before the valve 19 reseats will be determined by the rate of flow through needle valve 33, which rate of flow may be readily adjusted, as described.

Figure 6:
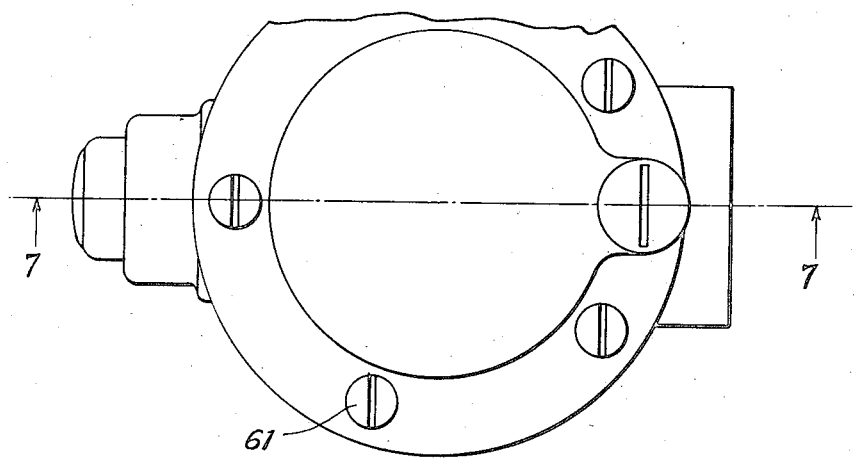
Fig. 6 is a partial plan view of a modified form of the device.
Figure 7:
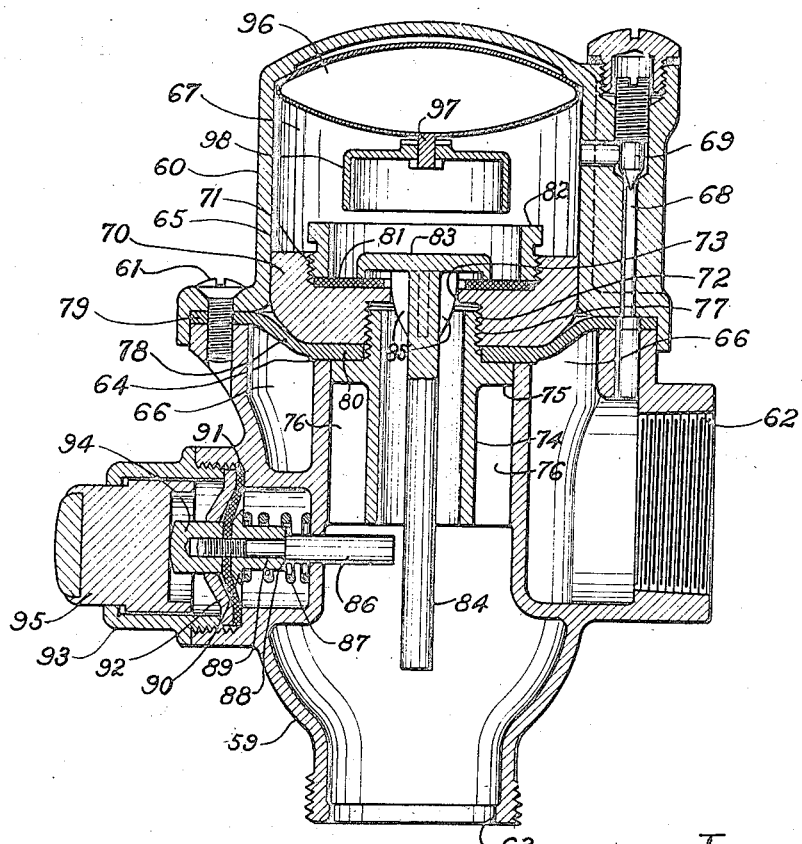
Fig. 7 is a central vertical section on line 7—7 of Fig. 6.

A different embodiment of the invention is shown in Figs. 6 and 7. In this form the base 59 and an upper portion 60 are shown as secured together by screws 61. The lower portion 59 is shown as provided with an inlet 62, an outlet 63, and a valve seat 64, as in the form of Figs. 1 to 5 inclusive. Also there is shown a movable element, as 65, exposed to the pressure of the water in space 66 and in a control chamber 67, which pressure is equalized by flow through a passage 68 under the adjustable control of a needle valve 69.

The movable element 65 is shown as comprising a body 70, recessed from above at 71 and from below at 72, and having an opening, as at 73. A guide having a cylindrical inner portion 74, a flange 75, guiding wings 76, and screw-threaded engagement with the recess 72 at 77, is shown. A diaphragm 78 may be utilized which will perform the function of gaskets at 79 and 80, the latter coacting with the valve seat 64. The diaphragm is shown as held at its outside edge by the screws 61, and at its center by the flange 75 and body 70.

A gasket 81 is shown held upon the floor of the recess 71 by a ring 82. A release valve 83 is shown as seated upon the gasket 81, which release valve performs the same function as that shown at 41 in Fig. 2. The release valve 83 is shown as provided with a stem 84 and guides 85, which latter insure correct location of the valve upon its seat.

To trip the valve 83 and thus relieve the pressure in chamber 67, a stem 86 is shown retracted by a spring 87. Stem 86 is shown as carrying a shoulder 88, upon which is seated a sleeve 89, having a head 90. A diaphragm 91 is shown retained by an annular dished member 92, which in turn is clamped by thimble 93. A cap 94, screwed upon the end of stem 86, is shown as adapted to reciprocate through the annular member 92 when pressed by the button 95.

When the button 95 is pressed the valve 83 will be tilted on its seat, allowing the water to escape from chamber 67, upon which the excess of pressure in space 66 will cause the diaphragm to be flexed upward and the movable member 70 to rise.

A float is shown at 96, carrying a stud 97 and loosely mounted on said stud a cup 98. As the member 70 rises the gasket 81 will come into contact with the edge of the cup 98, and if the valve 83 be held open the cup 98 will be held against the gasket as the water flows in through passage 68, carrying the float 96 downward as the diaphragm 78 is depressed against the valve seat 64. Upon closure of the valve 83 slow leakage about stud 97 will release cup 98, and the float 96 will return to the position shown in Fig. 7. The principle of operation of the form of the device is, therefore, the same as that of the modification first described.

Many minor changes may be made in the physical embodiment of the invention without departing from its spirit.

I claim as my invention—

1. A flush valve comprising, in combination, an inlet space, a valve seat, a control chamber having communication with said space by means of a restricted passage to equalize pressure in said chamber and space, a movable member between said chamber and space exposing a greater area to said chamber than to said space, a valve held to said seat by pressure upon said greater area, a relief valve to release the pressure in said chamber to allow the pressure in said space to open said first-named valve, a valve seat surrounding the head of said relief valve in said chamber, a cup member adapted to be brought into contact with said surrounding valve seat upon initial movement of said movable member and to be held in contact therewith by pressure in said chamber while said relief valve is held open and to separate therefrom upon equalization of pressure in said chamber and space when said relief valve is closed.

2. A flush valve comprising, in combination, an inlet space, a valve seat, a control chamber having communication with said space by means of a restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to open the first named valve and a normally open valve adapted to be closed by movement of the piston to render said relief valve ineffective after a predetermined flow of water.

3. A flush valve comprising, in combination, an inlet space, a valve seat, a control chamber having communication with said space by means of restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to open the first named valve, a normally open valve adapted to be closed by movement of the piston to render said relief valve ineffective after a predetermined flow of water, and a restricted by-pass communicating with the inlet pressure for releasing said normally open valve.

4. A flush valve comprising, in combination, an inlet space, a valve seat, a control chamber having communication with said space by means of a restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to raise the piston and open the first named valve, a normally open valve arranged to be closed by the upward movement of the piston and adapted when closed, to render the relief valve ineffective, and means for automatically opening the normally open valve.

5. A flush valve comprising, in combination, an inlet space, a valve seat, a control chamber having communication with said space by means of a restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to raise a piston and open the first named valve, a normally open valve capable to movement independently of the piston, arranged to be closed by the upward movement thereof and adapted when closed to render the relief valve ineffective, and means whereby the inlet pressure will effect the opening of said normally open valve after the first mentioned valve has closed.

6. A flush valve comprising, in combination, an inlet space, a valve seat, a control chamber having communication with said space by means of a restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to raise the piston and open the first named valve, a normally open valve adapted, when closed, to render the relief valve ineffective, arranged to be closed by the upward movement of the piston, and to be held closed by the inlet pressure and a by-pass adapted to relieve the inlet pressure and permit said normally open valve to open.

7. A flush valve comprising, in combination, an inlet space, a valve seat, a control chamber having communication with said space by means of a restricted passage to equalize the pressure in said chamber and space, a piston between said chamber and space exposing a greater area to said chamber than to said space, a valve held to said seat by pressure upon said greater area, a relief valve to relieve the pressure in said chamber to allow the pressure in said space to raise the piston and open the first named valve, a normally open valve in the control chamber adapted, when closed, to render the relief valve ineffective and arranged to be raised to closed position by the piston and held in that position by the inlet pressure independently of the piston and a by-pass for relieving the inlet pressure beneath said normally closed valve.

8. In a flush valve, a combination of a casing having an inlet and outlet, a valve controlling said outlet, a piston controlling said valve and dividing said casing into an inlet space and a control chamber, a by-pass connecting said chamber and space, a second by-pass connecting said control chamber and the outlet, a relief valve adapted to normally close said second by-pass and a normally opened valve closed by the movement of the piston for shutting said second by-pass.

9. In a flush valve, the combination of a casing having an inlet, an outlet and a valve seat between said inlet and outlet, a valve for said seat, a piston connecting with said valve and dividing said casing into an inlet space and a control chamber, a restricted by-pass connecting said inlet space with said control chamber, a second by-pass connecting said control chamber with said outlet, a relief valve adapted to open said second by-pass and permit the inlet pressure to raise the piston and open the first mentioned valve, a normally open valve for said second by-pass arranged to be closed by the rising of the piston and to be held closed until the second by-pass is closed.

FRED B. EDELL.